US005122319A

United States Patent [19]

Watanabe et al.

[11] Patent Number: 5,122,319

[45] Date of Patent: Jun. 16, 1992

[54] METHOD OF FORMING THIN-WALLED ELONGATED CYLINDRICAL COMPACT FOR A MAGNET

[75] Inventors: Teruo Watanabe, Aichi; Yasuaki Kasai, Nagoya; Hiyoshi Yamada, Iwakura; Norio Yoshikawa, Nagoya; Yutaka Yoshida, Tokai, all of Japan

[73] Assignee: Daido Tokushuko K.K., Aichi, Japan

[21] Appl. No.: 673,549

[22] Filed: Mar. 22, 1991

[30] Foreign Application Priority Data

Mar. 23, 1990 [JP] Japan .................................. 2-75095

[51] Int. Cl.[5] .............................................. B29C 43/04

[52] U.S. Cl. .................................. 264/109; 148/105; 264/DIG. 58; 419/66

[58] Field of Search ....... 264/109, 320, 323, DIG. 58; 419/66, 68, 5; 148/105, 104, 108, 100

[56] References Cited

U.S. PATENT DOCUMENTS

| | | | |
|---|---|---|---|
| 4,600,555 | 7/1986 | Shimizu | 419/5 |
| 4,690,791 | 9/1987 | Edmiston | 264/122 |
| 4,818,305 | 4/1989 | Steingroever | 148/103 |
| 4,981,635 | 1/1991 | Yamashita et al. | 264/112 |
| 5,004,580 | 4/1991 | Matsuo et al. | 419/65 |

FOREIGN PATENT DOCUMENTS

| | | | |
|---|---|---|---|
| 0270934 | 6/1988 | European Pat. Off. | 148/108 |
| 57-31109 | 2/1982 | Japan | 264/DIG. 58 |

*Primary Examiner*—Mary Lynn Theisen
*Attorney, Agent, or Firm*—Sughrue, Mion, Zinn, Macpeak & Seas

[57] ABSTRACT

A method of forming a cylindrical compact for a cylindrical magnet is improved by moving a core pin and a die of a mold at the same time of pressing magnet materials with a pressing punch in the same direction as that of the pressing punch at travelling speed Vc and Vd indicated by following equation:

$$Vc = m \cdot Vp (0.5 \leqq m \leqq 1.0)$$

$$Vd = n \cdot Vp (0.5 \leqq n \leqq 1.0)$$

where Vc is the travelling speed of the core pin, Vd is the travelling speed of the die and Vp is the pressing speed of the pressing punch. It is possible to form the thin-walled elongated cylindrical compact by utilizing the frictional force caused between the mold and the magnet materials for forming the compact very effectively in order to obtain a thin walled elongated cylindrical magnet.

4 Claims, 6 Drawing Sheets

METHOD OF FORMING THIN-WALLED ELONGATED CYLINDRICAL COMPACT FOR A MAGNET

BACKGROUND OF THE INVENTION

1. Field of the Invention

This invention relates to a method of forming an elongated thin-walled cylindrical compact for a magnet used for forming a cylindrical compact from powdered magnet materials in order to manufacture a magnet having a thin-walled elongated cylindrical shape.

2. Description of the Prior Art

In recent years, super-quenched type magnets of RE (rare earth elements)-Fe system such as a magnet of Nd-Fe-B system have attracted special interest as a magnet having excellent magnetic properties.

Heretofore, the forming of a cylindrical compact for a magnet of this kind has been carried out by using a mold exemplified in FIGS. 5(*a*) and 5(*b*).

A mold 51 shown in FIGS. 5(*a*) and 5(*b*) is provided with a core pin 52 in the central position, a die 54 disposed around the core pin 52 through a molding cavity 53, a pressing punch 55 disposed on one side of the molding cavity 53 and a receiving punch 56 disposed on another side of the molding cavity 53, which also functions as a knock out punch.

In case of forming the cylindrical compact by using the mold 51 having the aforementioned structure, first of all, powdered magnet material is obtained by crushing properly thin plate or flake-shaped base alloy which is turned out by super-quenching a molton alloy having predetermined chemical compositions such as a magnet of Nb-Fe-B system (may be added with Co, Ga, Dy and so on according to demand) through a molton metal quenching process.

Next, the aforementioned powdered magnet material or a green compact 57 is charged into the molding cavity 53 formed by the core pin 52, the die 54 and the receiving punch 56 as shown in FIG. 5(*a*). The green compact is a preparatory compact formed by cold-pressing the powdered magnet material so that its theoretical density ratio may be within a range of not more than 90%, generally within a range of 70% to 80% or so. The powdered magnet material or the green compact 57 is pressed and compressed by the pressing punch 55 with pressing speed Vp as shown in FIG. 5(*b*) at a temperature between 600° C. and 900° C., more preferably between 700° C. and 800° C. in a vacuum or in an atmosphere of an inert gas such as argon, and the cylindrical compact 58 is obtained by compressing until the density reaches a theoritical density ratio of not less than 98%, more preferably 99%.

A cylindrical shaped permanent magnet is obtained by magnetizing the aforementioned cylindrical compact 58 in a magnetic field.

However, there is a problem since it is difficult to form a thin-walled elongated cylindrical compact for obtaining a thin-walled and long-sized cylindrical magnet by the conventional forming method of the cylindrical compact.

Namely, the cylindrical magnet of this kind is utilized mostly in small-sized electric motors of automatizing appartus used in factories, offices and so on, and has been expected to make the motors lighter and smaller by using the thin-walled elongated cylindrical magnets making the most of their excellent magnetic properties. However, it is difficult to form the cylindrical compact into an elongated thin-walled shape present conditions in spite of the fact that it is necessary to obtain the thin-walled elongated cylindrical magnet. Therefore, the thin-walled and long-sized cylindrical compact is obtained by grinding the compact formed into an elongated thick-walled cylindrical shape or by joining some compacts formed into short, thin-walled cylindrical shape in the axial direction, for example.

Further explanation will be given on basis of FIG. 6 showing the molding cavity 53 of the mold 51 shown in FIG. 5 after enlargement.

In FIG. 6, at the time of pressing the powdered magnet material or the green compact of the powdered magnet material 57 after charging it into the molding cavity 53 formed by the core pin 52, the die 54 and the receiving punch 56, if the pressing speed of the pressing punch 55 is represented by Vp, pressing speed V in the downward direction for the powdered material at the position away upwardly from the upper face 56*a* of the receiving punch 56 is given by:

$$V = Vp(x/l)$$

wherein l is height of the cylindrical compact. The pressure corresponding to frictional forces $\mu Pc$ between the compact and the core pin 52 and $\mu Pd$ between the compact and the die 54 ($\mu$ is coefficient of friction) in the upward direction is required for this part of the compact in addition to the pressure required for the compressive deformation of the compact in itself.

Accordingly, pressure P required to form the compact including above is given by following equation of theoretical calculation:

$$P = (2.155e^{2\mu x/t} - 1.155)k$$

wherein $\mu$ is coefficient of friction between the mold and the compact (approximately 0.08), e is the base of natural logarithm and k is the pressure required to deform the compact in itself. It is necessary to apply a pressure higher than this in order to form the compact in practice.

On the one side, the pressure k required for compressive deformation of the powdered magnet material of Nd-Fe-B system is approximately 8 kgf/mm$^2$ and the calculated results of the pressure P required to form the compact in this case are shown in FIG. 3. In this case, x/t is read along the transverse axis with a scale on the lower side in FIG. 3.

As it is clear from FIG. 3, it is necessary to apply the high pressure as much as 76 kgf/mm$^2$ to the pressurized face 55*a* of the pressing punch 55 in order to obtain the compact having a height being ten times its wall thickness (l/t=10), for example.

On the other side, is desirable to carry out the forming at a temperature between 600° C. and 900° C., so that the mold 51 to be used is also preheated at the temperature. In practice it is impossible to form the thin-walled elongated cylindrical compact because an elongated pressing punch 55 is capable of resisting a pressure no more than 25 kgf/mm$^2$ without buckling in the case of making the pressing punch 55 with heat resisting alloy, and merely possible to resist the pressure of about 40 kgf/mm$^2$ at the aforementioned temperature even when the pressing punch 55 is made with hard metal. Accordingly, the forming limit of the cylindrical compact is 4.3 to 6.5 according to the quality of the pressing punch 55 indicating by the ratio of the length to the wall thickness (l/t) of the cylindrical compact.

SUMMARY OF THE INVENTION

This invention is made in view of the above-mentioned problem of the prior art and it is an object of the invention to provide a method by which it is possible to form a thin-walled cylindrical compact lengthened as compared with a conventional one in order to obtain a thin-walled elongated cylindrical magnet.

A method of forming a thin-walled elongated cylindrical compact according to this invention comprises charging powdered magnet material or a green compact of the powdered magnet material into a molding cavity of a mold provided with a core pin sited in the center, a die disposed around the core pin through the molding cavity, a pressing punch disposed on one side of the molding cavity and a receiving punch disposed on another side of said molding cavity and in subsequently pressing the powdered magnet material or the green compact of the powdered magnet material with the pressing punch, and is characterized in that the compact is formed into cylindrical shape upon moving the core and the die at the same time of the pressing with the pressing punch in the same direction as that of the pressing punch at travelling speeds Vc and Vd indicated by following equations:

$$Vc = m \cdot Vp (0.5 \leq m \leq 1.0)$$

$$Vd = n \cdot Vp (0.5 \leq n \leq 1.0)$$

where Vc is the travelling speed of the core pin, Vd is the travelling speed of the die and Vp is the pressing speed of the pressing punch. The above-mentioned construction of the method of forming the thin-walled elongated cylindrical compact is introduced as a measure for solving the aforementioned problem of the prior art.

In the method of forming the thin-walled elongated cylindrical compact according to a preferred aspect of this invention, the forming of the cylindrical compact may be carried out at a temperature between 600° C. and 900° C. in a vacuum of not more than 10 Torr or in an atmosphere of an inert gas.

The powdered magnet material which is used as powder without preforming or as a green compact formed preparatively may be used magnet materials of RE-Fe system. For example, it is possible to select from the magnet materials of Re-Fe system indicated as following formula:

$$R_{1-\alpha-\beta-\gamma}\{Fe(Ni, Mn, Co)\}_{\alpha}X_{\beta}M_{\gamma}$$

wherein R represents one or more of rare earth elements, X represents one or more selected from B, C, N, Si and P, M represents one or more selected from Ti, Zr, Hf, V, Nb, Ta, Cr, Mo, W, Al, Zn, Ga, In, Tl and so on, $\alpha$ takes the value within a range of 0.60 to 0.85, $\beta$ takes the value not more than 0.15, and $\gamma$ takes the value not more than 0.01.

DETAILED DESCRIPTION OF THE INVENTION

Figure 1A:
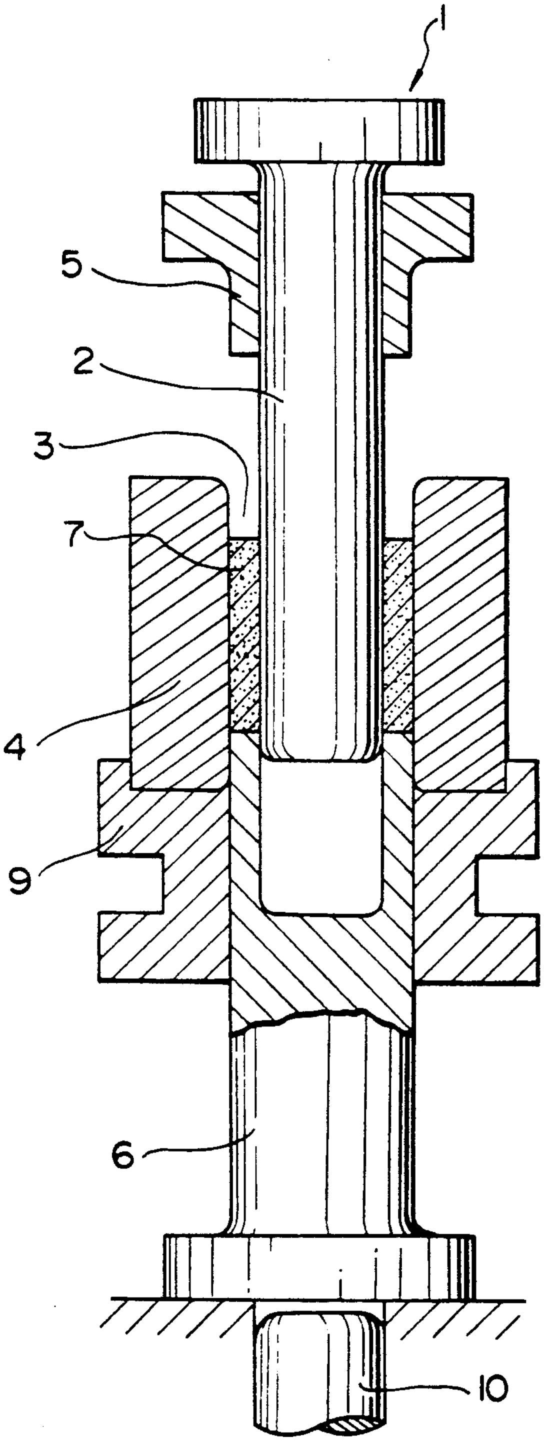
FIGS. 1(*a*) and 1(*b*) are vertical sectional views illustrating the states of the mold used for the method of forming the thin-walled elongated cylindrical compact before and after pressurizing with the pressing punch, respectively.
Figure 1B:
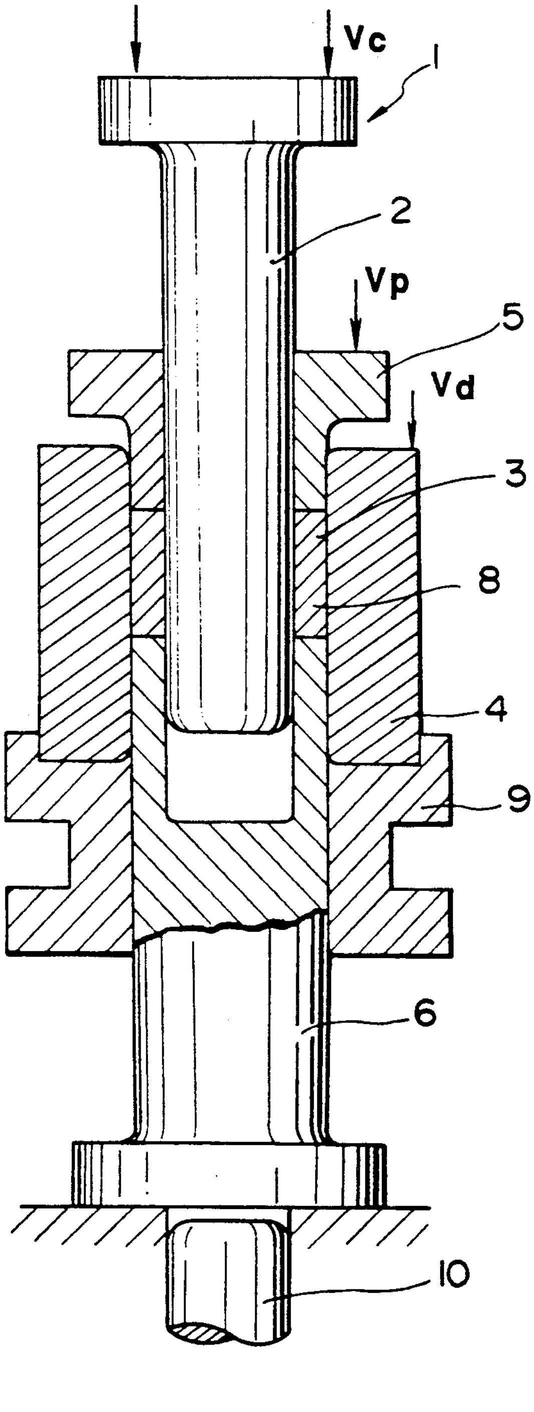

FIGS. 1(*a*) and 1(*b*) illustrate an embodiment of the method of forming the thin-walled elongated cylindrical compact according to this invention.

Namely, in the conventional method of forming the compact, frictional resistance caused between the mold and materials is applied entirely to the pressing punch. In this invention, the forming method is so improved as to utilize also the frictional force positively for forming the compact by changing the working direction of the frictional force, and it becomes possible to form the compact into the thin-walled, elongated cylindrical shape as compared with the conventional forming method.

A mold 1 shown in FIG. 1 is provided with a core pin 2 sited in the center, a die 4 disposed around the core pin 2 through a molding cavity 3, a pressing punch 5 disposed on one side of said molding cavity 3 and a receiving punch 6 disposed on another side of the molding cavity 3, which also functions as a knock out punch. And the core pin 2 is so structured as to ascend and descend by a hydraulic piston or the like (not shown), the die 4 is fixed with a die holder 9 and structured so as to ascend and descend together with the die holder 9 and the receiving punch 6 is so structured as to ascend and descend by a knock out plunger 10.

Next, the forming procedures of the thin-walled elongated cylindrical compact using the mold 1 having aforementioned structure will be described below including the function.

First of all, thin-plate or flake-shaped base alloy is made by super-quenching a molton alloy having predetermined chemical compositions such as a magnet alloy of Nd-Fe-B system (may be added with Co, Ga, Dy and so on according to demand) through a molton metal quenching process, and then powdered magnet is obtained by crushing the thin-plate or flake-shaped base alloy.

Subsequently, the powdered magnet material 7 is charged into the molding cavity 3 formed by the core pin 4, the die and the receiving punch 6. Otherwise a green compact 7 may be charged into the molding cavity 3 which is formed preparatively by cold-pressing the powdered magnet material so as to make the theoretical density ratio within a range of not more than 90%, or within a range of 70% to 80% or so in general. The powdered magnet material or the green compact 7 is compressed at a temperature between 600° C. and 900° C., more preferably between 700° C. and 800° C. in a vacuum of not more than 10 Torr or in an atmosphere of inert gas such as argon by applying pressure to the pressing punch 5 at pressing speed Vp as shown in FIG. 1(*b*). In this case, it is suitable to nearly coordinate the pressing speed Vp of the pressing punch 5 with that in a case of forming common powdered materials. Generally, the forming should be carried out at the pressing speed of 5 to 30 mm/sec.

At the same time of applying the pressure with the pressing punch 5 at pressing speed Vp, the core pin 2 and the die 4 are moved in the same direction as the pressing direction of the pressing punch 5 at travelling speeds Vc and Vd, respectively. In this time, the travelling speed Vc of the core pin 2 is indicated by $m.Vp(0.5 \leqq m \leqq 1.0)$, and the travelling speed Vd the die 4 is indicated by $n.Vp(0.5 \leqq n \leqq 1.0)$. Thereby, a thin-walled elongated cylindrical compact 8 is obtained by compressing the powdered magnet material or the green compact 7 until the density reaches not less than 98%, preferably 99% by the theoretical density ratio. The thin-wall elongated cylindrical compact 8 is taken out of the die 4 by elevating the receiving punch 6 together with the knock out plunger 10.

Figure 2:
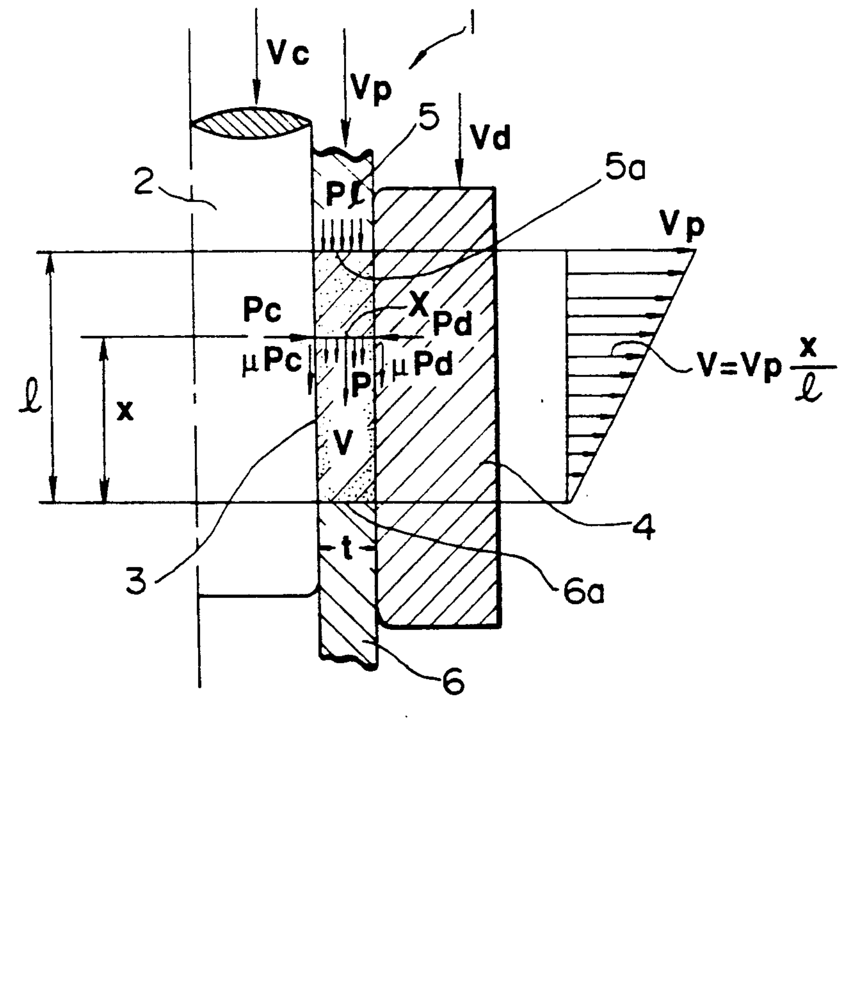
FIG. 2 is a enlarged sectional view of the molding cavity of the mold shown in FIG. 1(*b*)

FIG. 2 shows an enlarged detail of the molding cavity 3 shown in FIG. 1(*b*), at the time of applying the pressure to the powdered magnet material or the green compact 7 with the pressing punch 5 after charging it into the molding cavity 3 formed by the core pin 2, the die 4 and the receiving punch 6, if the pressing speed of the pressing punch 5 is represented by Vp, pressing speed V in the downward direction for the powdered material at the position away upwardly from the upper face 6*a* of the receiving punch 6 is given by:

$$V = Vp(x/l)$$

wherein l height of the cylindrical compact. At this time, frictional forces $\mu Pc$ and $\mu Pd$ at the respective surfaces of the core pin 2 and the die 4 act downwardly, that is in the compressive direction by setting the travelling speeds Vc and Vd of the core pin 2 and the die 4 so as to be larger than aforementioned pressing speed V, respectively ($Vc = Vd > V$). The compression of the compact is promoted by these frictional forces $\mu Pc$ and $\mu Pd$.

Accordingly, it is possible to utilize the frictional force at the overall length of the cylindrical compact 8 for the compression of the compact by setting aforementioned travelling speeds Vc and Vd equal to the pressing speed Vp of the pressing punch 5 ($Vc = Vd = Vp$).

In this case, pressure P applied to a cross section at position x is given by following equation on theoritical calculation:

$$P = (2.155e^{2\mu(l-x)/t} - 1.155)k$$

wherein $\mu$ is coefficient of friction between the mold and the compact, e is the base of natural logarithm, k is the pressure required to deform the compact in itself, and l is height of the compact, but in practice the pressure higher than above acts on the cross section.

Figure 3:
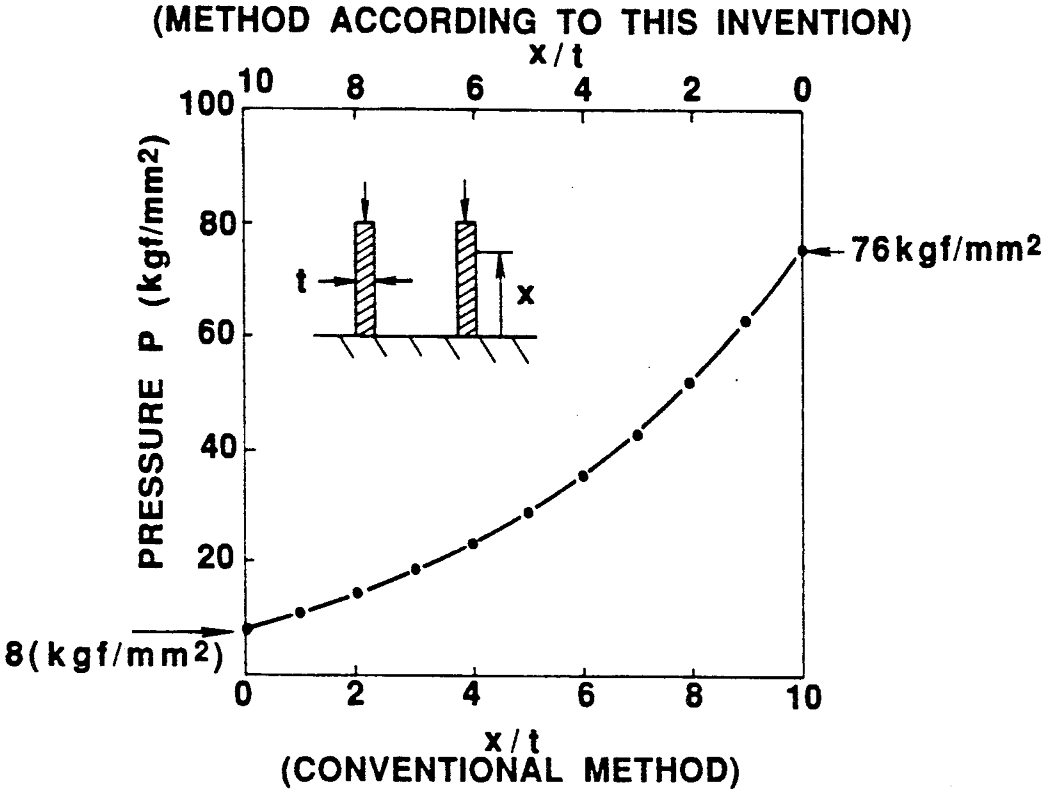
FIG. 3 is a graph showing the theoretically calculated values of pressure P applied to the position x.

The calculated results of the pressure P under the same condition as that of the exemplified case about the conventional method is also shown in FIG. 3 is addition to the results of the conventional method. At this time, x/t is read along the transverse axis with a scale on the upper side in FIG. 3.

As it is clear from FIG. 3, in the case of obtaining the cylindrical compact 8 of which height is ten times its wall thickness ($l/t = 10$) for example, compressive force as much as 76 $kgf/mm^2$ is applied to the lower surface of the cylindrical compact 8 by only applying a pressure of 8 $kgf/mm^2$ which is equal to the pressure required to deform the compact in itself to the pressurized face 5*a* of the pressing punch 5 in contact with the upper surface of the cylindrical compact 8.

Although, the case is described above in which all of the frictional force caused among the core pin 2, die 4 and the cylindrical compact 8 at the overall length is utilized for forming the compact 8, in the majority case it is sufficient to use an about half length of the compact 8 from a practical point of view. Namely, wall thickness t and height l of the cylindrical compact 8 can be expressed as dimensional limits of the thin-walled elongated cylindrical compact used for the aforementioned purpose, as follows:

$$t = 5(\%) \times d = 0.05d$$

$$l = (\tfrac{1}{2}) \times d = 0.5d$$

wherein d represents the outer diameter of the cylindrical compact 8, therefore l over t (l/t) is equal to ten (10).

On the other side, it seems that the pressing punch 51 can tolerate the pressure until ratio of l to t reaches five ($l/t = 5$) even by the conventional method as shown in FIG. 3, therefore the practical value of this invention is recognized in a case of utilizing the frictional force for forming the compact of which ratio of x to t is higher than five ($x/t > 5$).

Accordingly, proper ranges of the travelling speeds Vc and Vd of the core pin 2 and the die 4 are given by following equation, respectively:

$$Vc = m \cdot Vp(0.5 \leqq m \leqq 1.0)$$

$$Vd = n \cdot Vp(0.5 \leqq n \leqq 1.0)$$

EXAMPLE

A base alloy consisting of 30 wt % of Nd, 1 wt % of B, 2.5 wt % of Co, and Fe of the balance was molten and made into thin plates of about 20 $\mu m$ in thickness through the super-quenching method. Flaky powder of about 200 $\mu m$ was obtained by crushing the thin plates.

Secondly, the flaky powder of the magnet material was mixed with 0.8 wt % of zinc stearate, and a cylindrical green compact having an outer diameter of 39.8 mm, an inner diameter of 36.2 mm and a height of 28 mm was obtained by forming the mixture at a room temperature using a general oil hydraulic press. Theoretical density ratio of the obtained green compact was 79%.

Next, the green compact 7 was charged into the molding cavity 3 of the mold 1 shown in FIG. 1, and the mold 1 was set in a airtight container so as to prevent the green compact 7 from the oxidation by replacing air in the container with argon.

The mold 1 used in this time was provided with a core pin 2 having an outer diameter of 36 mm, and a die 4 having an inner diameter of 40 mm. And the mold 1 was maintained at 750° C. in advance.

In an atmosphere of argon, the green compact 7 was kept for 120 seconds at a state in which a compressive force of 5 $kgf/mm^2$ is applied to the upper face of the green compact 7 by forcing the pressing punch 5 down at low pressure, thereby heating the green compact 7 at a predetermined temperature by heat transmission from the mold 1.

Subsequently, respective cylindrical compacts 8 were obtained by depressing the core pin 2 and the die 4 at various travelling speeds Vc and Vd (Vc=Vd) at the same time of forcing down the pressing punch 5 at a pressing speed of 3 mm/sec and the maximum pressure of 25 kgf/mm. At this time, the travelling speeds Vc and Vd of the core pin 2 and the die 4 were set at 0, 0.6, 1.2, 1.8, 2.4 and 3 mm/sec, respectively, for six different examples as shown in FIG. 4.

Figure 4:
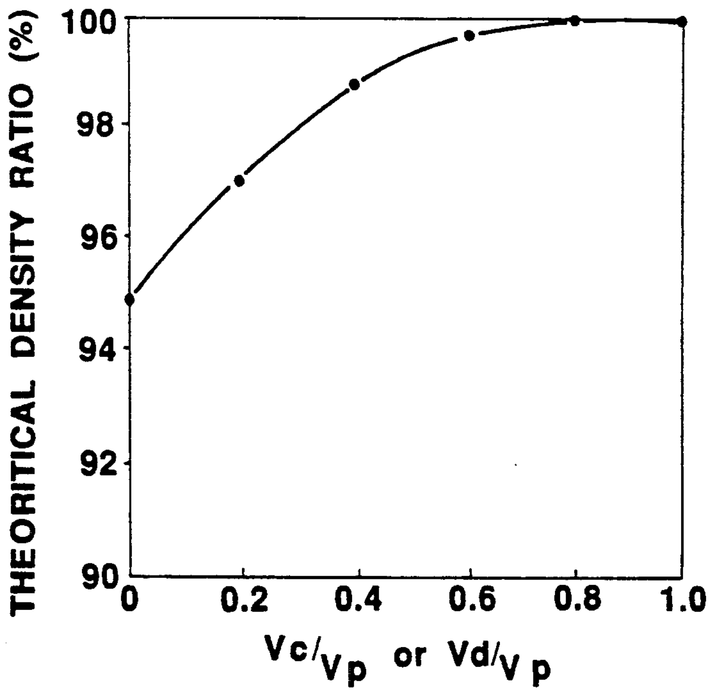
FIG. 4 is a graph exemplifying the relationship between theoretical density ratio of the cylindrical compact and travelling speeds of the core pin, the die and the pressing punch in the example of this invention.
Figure 5A:
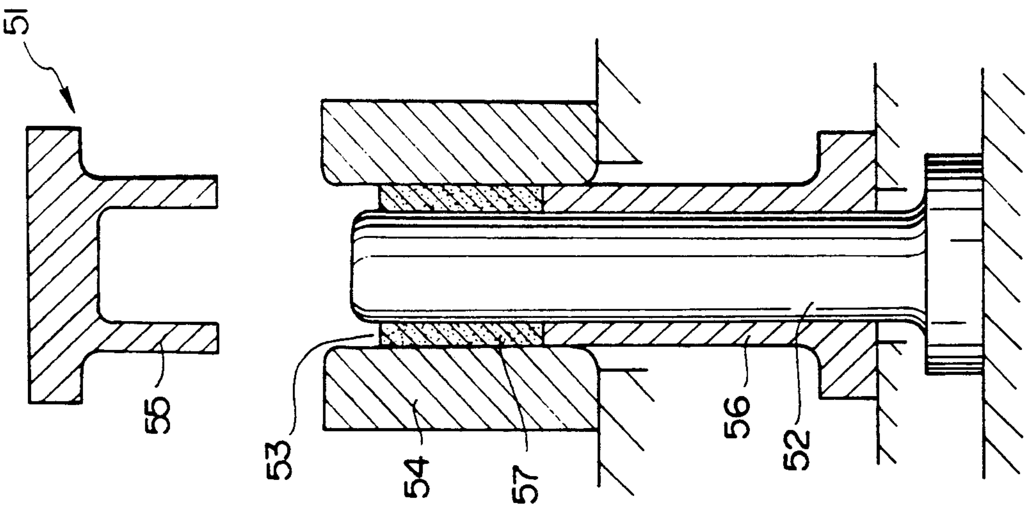
FIG. 5(a) (PRIOR ART)
FIGS. 5(*a*) and 5(*b*) are vertical sectional views illustrating the states of the conventional mold used for the conventional method of forming the cylindrical compact before and after pressurizing with the pressing punch, respectively.
Figure 5B:
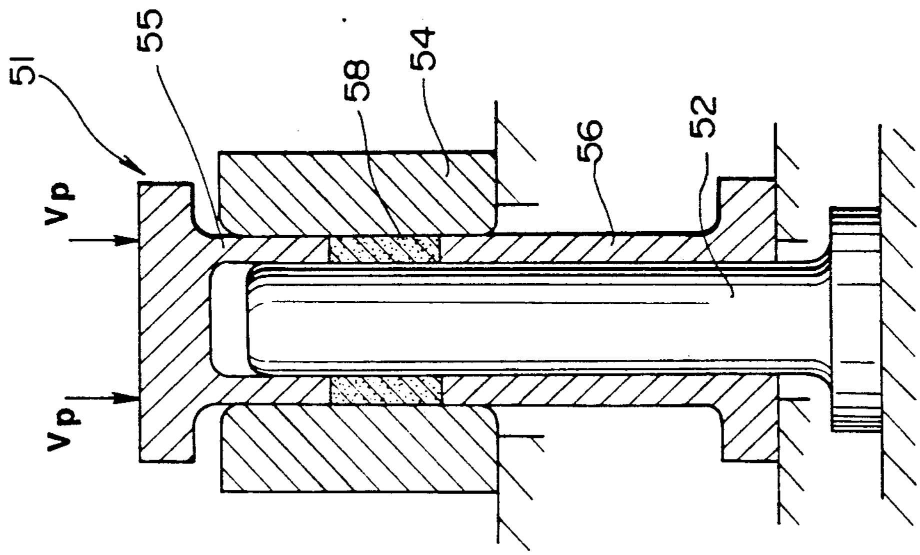
FIG. 5(b) (PRIOR ART)
Figure 6:
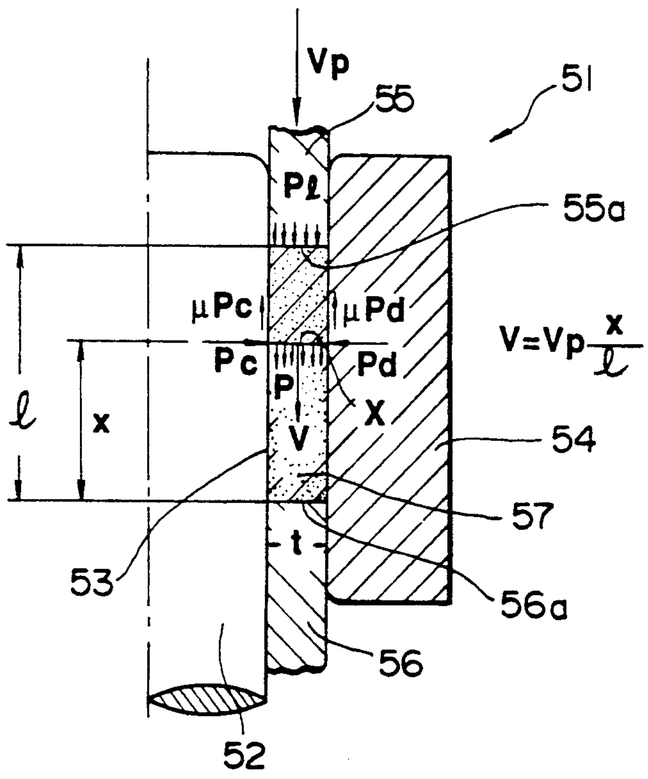
FIG.6 (PRIOR ART)
FIG. 6 is a enlarged sectional view of the molding cavity of the mold shown in FIG. 5(*b*).

The theoretical density ratio of the respective cylindrical compact 8 obtained at this time was measured, and the results were illustrated in FIG. 4 after the arrangement according to the ratio of travelling speed Vc or Vd of the core pin 2 or the die 4 to the pressing speed Vp of the pressing punch 5 (Vc/Vp or Vd/Vp).

It was clear from FIG. 4 that the theoritical density ratio of the cylindrical compact 8 increases in company with the increase of the ratio of Vc/Vp or Vd/Vp, and it was seen that the frictional force caused between the mold 1 and the green compact 7 is utilized very effectively for compressing the green compact 7 into the cylindrical compact 8.

As mentioned above, the method of forming a thin-walled and long-sized cylindrical compact according to this invention comprises charging powdered magnet material or a green compact of the powdered magnet material into a molding cavity of a mold provided with a core pin sited in the center, a die disposed around the core pin sited in the center, a die disposed around the core pin through the molding cavity, a pressing punch disposed on one side of the molding cavity and a receiving punch disposed on another side of said molding cavity and in subsequently pressing the powdered magnet material or the green compact of the powdered magnet material with the pressing punch, and is characterized in that the compact is formed into cylindrical shape as moving the core pin and the die at the same time of the pressing with the pressing punch in the same direction as that of the pressing punch at travelling speeds Vc and Vd indicated by following equations:

$$Vc = m \cdot Vp (0.5 \leqq m \leqq 1.0)$$

$$Vd = n \cdot Vp (0.5 \leqq n \leqq 1.0)$$

where Vc is the travelling speed of the die, Vd is the travelling speed of the core pin, Vd is the travelling speed of the die and Vp is the pressing speed of the pressing punch. Therefore, it is possible to form the thin-walled cylindrical compact longer than conventional one, it is not necessary always to make the pressing punch with special materials such as heat resisting alloy or hard metal because it is possible to reduce the pressure required for the pressing punch remarkably as compared with the conventional forming method, and because the thin-walled and long-sized cylindrical compact can be formed in united one body without troublesome procedures such as the grinding of the thick-walled cylindrical compact or the joining of the short-sized cylindrical compact. Accordingly, an excellent effect can be obtained since it is possible to realize miniaturization of various apparatus used with a cylindrical magnet very easily.

What is claimed is:

1. A method of forming a thin-walled elongated cylindrical compact which comprises charging powdered magnet material or a green compact of said powdered magnet material into a molding cavity of a mold provided with a core pin sited in the center, a die disposed around the core pin through said molding cavity, a pressing punch disposed on one side of said molding cavity and a receiving punch disposed on another side of said molding cavity, and in subsequently pressing said powdered magnet material with said pressing punch, wherein said compact is formed into cylindrical shape by pressing with said pressing punch while the core pin and the die are moved simultaneously with said pressing punch at travelling speeds Vc and Vd, respectively, indicated by the following equations:

$$Vc = m \cdot Vp (0.5 < m < 1.0)$$

$$Vd = n \cdot Vp (0.5 < n < 1.0)$$

where Vc is the travelling speed of the core pin, Vd is the travelling speed of the die and Vp is the pressing speed of the pressing punch.

2. A method of forming a thin-walled elongated cylindrical compact as claimed in claim 1, wherein said compact is formed at a temperature between 600° C. and 900° C. in a vacuum of not more than 10 Torr or in an atmosphere of an inert gas.

3. A method of forming a thin-walled elongated cylindrical compact as claimed in claim 1, wherein said powdered magnet material is made from magnet materials of RE-Fe system.

4. A method of forming a thin-walled elongated cylindrical compact as claimed in claim 2, wherein said powdered magnet material is made from magnet materials of RE-Fe system.

* * * * *